(12) United States Patent (10) Patent No.: US 11,356,311 B2
Parkvall et al. (45) Date of Patent: *Jun. 7, 2022

(54) SCRAMBLING OF PHYSICAL CHANNELS AND REFERENCE SIGNALS IN WIRELESS COMMUNICATION NETWORKS

(71) Applicant: Telefonaktiebolaget LM Ericsson (publ), Stockholm (SE)

(72) Inventors: Stefan Parkvall, Bromma (SE); Robert Baldemair, Solna (SE); Claes Tidestav, Bålsta (SE); Mattias Frenne, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/957,199

(22) PCT Filed: Jan. 7, 2019

(86) PCT No.: PCT/IB2019/050111
§ 371 (c)(1),
(2) Date: Jun. 23, 2020

(87) PCT Pub. No.: WO2019/138314
PCT Pub. Date: Jul. 18, 2019

(65) Prior Publication Data
US 2020/0351137 A1 Nov. 5, 2020

Related U.S. Application Data

(60) Provisional application No. 62/616,803, filed on Jan. 12, 2018.

(51) Int. Cl.
*H04L 27/26* (2006.01)
*H04W 76/11* (2018.01)
(Continued)

(52) U.S. Cl.
CPC ........ *H04L 27/2613* (2013.01); *H04L 5/0051* (2013.01); *H04L 5/10* (2013.01); *H04W 72/0466* (2013.01); *H04W 76/11* (2018.02)

(58) Field of Classification Search
CPC ..... H04L 27/2613; H04L 5/0051; H04L 5/10; H04W 76/11; H04W 72/0466; H04W 72/042; H04W 72/04
(Continued)

(56) References Cited

U.S. PATENT DOCUMENTS 8,503,547 B2  8/2013  Luo et al.
2009/0268910 A1  10/2009  Liu et al.
(Continued)

FOREIGN PATENT DOCUMENTS

RU  2433554 C2  11/2011
RU  2013152734 A  9/2015
WO  2010/017475 A2  2/2010

OTHER PUBLICATIONS

Indian Examination Report dated Sep. 9, 2021 issued in corresponding Indian Patent Application No. 202047033625, consisting of 6 pages.
(Continued)

*Primary Examiner* — Candal Elpenord
(74) *Attorney, Agent, or Firm* — Christopher & Weisberg, P.A.

(57) ABSTRACT

Radio network nodes, wireless devices, and related methods are provided in which a pseudo-random sequence initialization value, which is used during the generation of pseudo-random and/or scrambling sequences, is based, at least in part, on a first identifier, wherein the first identifier is equal to a first parameter if the first parameter has been configured and if a second identifier corresponds to a wireless-device-specific identifier.

20 Claims, 5 Drawing Sheets (51) Int. Cl.
  *H04W 72/04* (2009.01)
  *H04L 5/10* (2006.01)
  *H04L 5/00* (2006.01)
(58) Field of Classification Search
  USPC .................................................. 370/329–330
  See application file for complete search history.

(56) References Cited

U.S. PATENT DOCUMENTS

| | | | |
|---|---|---|---|
| 2010/0034161 A1 | 2/2010 | Luo et al. | |
| 2011/0085503 A1 | 4/2011 | Nam et al. | |
| 2012/0176884 A1 | 7/2012 | Zhang et al. | |
| 2012/0250642 A1 | 10/2012 | Qu et al. | |
| 2013/0039284 A1 | 2/2013 | Marinier et al. | |
| 2013/0188558 A1* | 7/2013 | Nam ..................... | H04W 48/12 370/328 |
| 2013/0215845 A1* | 8/2013 | Lee ....................... | H04L 1/0072 370/329 |
| 2014/0071936 A1* | 3/2014 | Zhang ................... | H04L 5/0051 370/330 |
| 2014/0092829 A1 | 4/2014 | Han et al. | |
| 2014/0341180 A1* | 11/2014 | Liu ....................... | H04L 5/0051 370/330 |
| 2016/0366717 A1 | 12/2016 | Yang et al. | |
| 2018/0070369 A1* | 3/2018 | Papasakellariou ............................ | H04W 72/0406 |
| 2018/0115443 A1* | 4/2018 | Mauritz .............. | H04W 72/042 |
| 2019/0013848 A1 | 1/2019 | Xiong et al. | |
| 2019/0098611 A1* | 3/2019 | Shimezawa ........... | H04L 5/0044 |
| 2019/0104007 A1 | 4/2019 | Wang et al. | |
| 2019/0215119 A1 | 7/2019 | Kim et al. | |
| 2019/0229964 A1* | 7/2019 | Ouchi ................. | H04L 27/2613 |
| 2021/0242995 A1* | 8/2021 | Noh ...................... | H04L 5/0051 |

OTHER PUBLICATIONS

3GPP TS 38.211 V15.1.0 (Mar. 2018) 3rd Generation Partnership Project; Technical Specification Group Radio Access Network; NR; Physical Channels and Modulation (Release 15), consisting of 90 pages.
Russian Office Action and English translation of the Russian Office Action issued in corresponding Russian Application No. 2020126784, dated Feb. 3, 2021, consisting of 13 pages.
International Search Report and Written Opinion dated Apr. 17, 2019 issued in PCT Application No. PCT/B2019/050111, consisting of 22 pages.
International Preliminary Report on Patentability dated Mar. 13, 2020 dated Apr. 17, 2019 issued in PCT Application No. PCT/IB2019/050111, consisting of 21 pages.
3GPP TS 38.211 V15.0.0 (Dec. 2017) 3rd Generation Partnership Project; Technical Specification Group Radio Access Network; NR; Physical Channels and Modulation (Release 15), consisting of 73 pages.
3GPP TSG RAN WG1 Meeting AH 1801; R1-1800689; Source: Ericsson; Title: Correction on CW Mapping and Data Scrambling; Agenda Item: 7.2.1.1; Document for Discussion and Decision, Vancouver, Canada, Jan. 22-26, 2018, consisting of 3 pages.
3GPP TSG RAM WG1 Meeting AH 1801; R1-1800706; Source: Ericsson; Title: Corrections Related to DMRS; Agenda Item: 7 2.3.3; Document for Discussion and Decision, Vancouver, Canada, Jan. 22-26, 2018, consisting of 7 pages.
3GPP TS 36.211 V14.5.0 (Dec. 2017) 3rd Generation Partnership Project; Technical Specification Group Radio Access Network; Evolved Universal Terrestrial Radio Access (E-UTRA); Physical Channels and Modulation (Release 14), consisting of 197 pages.
3GPP TS 38.321 V15.0.0 (Dec. 2017) 3rd Generation Partnership Project; Technical Specification Group Radio Access Network; NR; Medium Access Control (MAC) Protocol Specification (release 15), consisting of 55 pages.
Non-Final Rejection dated Jul. 10, 2019 issued in U.S. Appl. No. 16/361,874,consisting of 17 pages.
Final Rejection dated Novembers, 2019 issued in U.S. Appl. No. 16/361,874,consisting of 11 pages.
Second Non-Final Rejection dated Mar. 27, 2020 issued in U.S. Appl. No. 16/361,874,consisting of 12 pages.
Japanese Office Action and English Summary of the Japanese Office Action dated Feb. 10, 2022 issued in corresponding Japanese Application No. 2020-536168, consisting of 6 pages.
Japanese Office Action and machine English translation of the Japanese Office Action dated Oct. 8, 2021 issued in corresponding Japanese Application No. 2020-536168, consisting of 8 pages.
MediaTek Inc.; R1-1700157; 3GPP TSG RAN WG1 Meeting #87; Title: Considerations on Receiver Based Techniquess for Interface Management; Agenda Item: 5.1.7.2; Document for: Discussion, Spokane, USA, Jan. 16-20, 2017, consisting of 5 pages.
Ericsson; R1-1714049; 3GPP TSG RAN WG1 Meeting #90; Title: Further Details on Scrambling; Agenda Item: 6.2; Document for: Discussion and Decision, Prague, Czech Republic, Aug. 21-25, 2017, consisting of 3 pages.
AT&T; 3GPP TSG RAN WG1 Meeting #91; Title: On Data Scrambling for NR PDSCH and PUSCH; Agenda Item: 7.2.1; Document for: Discussion/Decision, Reno, USA, Nov. 27-Dec. 1, 2017, consisting of 3 pages.
CMCC; 3GPP TSG RAN WG2 Meeting #100; Title: Common C-RNTI for Common PDCCH; Agenda Item: 10.3.1.6; Document for: Discussion, Reno, USA, Nov. 27-Dec. 1, 2017, consisting of 3 pages.
Russian Office Action and English translation of the Russian Office Action issued in corresponding Russian Application No. 2020126784, dated Feb. 3, 2021.

\* cited by examiner

SCRAMBLING OF PHYSICAL CHANNELS AND REFERENCE SIGNALS IN WIRELESS COMMUNICATION NETWORKS

CROSS-REFERENCE TO RELATED APPLICATIONS

This application is a Submission Under 35 U.S.C. § 371 for U.S. National Stage Patent Application of International Application No.: PCT/IB2019/050111, filed Jan. 7, 2019 entitled "SCRAMBLING OF PHYSICAL CHANNELS AND REFERENCE SIGNALS IN WIRELESS COMMUNICATION NETWORKS," which claims priority to U.S. Provisional Application No. 62/616,803, filed Jan. 12, 2018, the entireties of both of which are incorporated herein by reference.

TECHNICAL FIELD

The present description generally relates to wireless communications and wireless communication networks, and more particularly relates to scrambling of physical channels and/or physical signals in wireless communication networks.

BACKGROUND

Transmissions of the physical downlink shared channel (PDSCH) in NR (i.e., 3GPP 5G standard) are scrambled as specified in section 7.3.1.1 of 3GPP TS 38.211 V15.0.0 reproduced below.

7.3.1.1 Scrambling

Up to two codewords can be transmitted, $q \in \{0,1\}$. In case of single-codeword transmission, $q=0$.

For each codeword q, the UE shall assume the block of bits $b^{(q)}(0), \ldots, b^{(q)}(M_{bit}^{(q)}-1)$, where $M_{bit}^{(q)}$ is the number of bits in codeword q transmitted on the physical channel, are scrambled prior to modulation, resulting in a block of scrambled bits $\tilde{b}^{(q)}(0), \ldots, \tilde{b}^{(q)}(M_{bit}^{(q)}-1)$ according to $$\tilde{b}^{(q)}(i) = (b^{(q)}(i) + c^{(q)}(i)) \bmod 2$$

where the scrambling sequence $c^{(q)}(i)$ is given by clause 5.2.1. The scrambling sequence generator shall be initialized with $$c_{init} = n_{RNTI} \cdot 2^{15} + q \cdot 2^{14} + n_{ID}$$

where $n_{ID} \in \{0, 1, \ldots, 1023\}$ equals the higher-layer parameter Data-scrambling-Identity if configured, $n_{ID} = N_{ID}^{cell}$ otherwise Also, in NR, some downlink reference signals such as the demodulation reference signal (DM-RS) are generated using a pseudo-random sequence as specified in section 7.4.1.1.1 of 3GPP TS 38.211 V15.0.0 reproduced below.

7.4.1.1.1 Sequence Generation

The UE shall assume the reference-signal sequence r(m) is defined by $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is defined in clause 5.2. The pseudo-random sequence generator shall be initialized with $$c_{init} = (2^{17}(14n_s + l + 1)(2N_{ID}^{nSCID} + 1) + 2N_{ID}^{nSCID} + n_{SCID}) \bmod 2^{31}$$

where l is the OFDM symbol number within the slot and $n_{SCID} \in \{0,1\}$ and $N_{ID}^{nSCID} \in \{0, 1, \ldots, 65535\}$ is given by
  the higher-layer parameter DL-DMRS-Scrambling-ID if provided $n_{SCID} = 0$ and $N_{ID}^{nSCID} = N_{ID}^{cell}$ otherwise As indicated above, in NR, it is possible to use a configurable value or identifier, for instance $n_{ID}$ for PDSCH message and $N_{ID}^{nSCID}$ for DM-RS, in the generation of the initialization value (also referred to as a scrambling seed) instead of using the physical-layer cell identity, $N_{ID}^{cell}$. The reason for this is to allow for UEs (also referred to as wireless devices) to move between cells, or to receive transmissions from multiple cells, without having to be reconfigured.

SUMMARY

The radio network temporary identifier (RNTI) is an identity of the wireless device (or UE). It can take multiple values. For instance, the C-RNTI is a wireless-device-specific identity, unique within a cell and typically used for unicast transmission. There are also common RNTIs used for common messages, e.g., paging, system information delivery, and other similar functions.

Common messages using a common RNTI and targeting multiple wireless devices, e.g., paging messages, system information delivery, and random-access response, cannot be delivered to wireless devices having a configured $n_{ID}$ or a configured $N_{ID}^{nSCID}$ as these wireless devices are likely to have different values configured (e.g., different from $N_{ID}^{cell}$).

Hence, in a broad aspect, a first identifier (e.g., $n_{ID}$ or $N_{ID}^{nSCID}$) to be used in the generation of an initialization value (or scrambling seed) will be equal to a first parameter only if the first parameter is configured and if a second identifier (e.g., a RNTI) corresponds to a wireless-device-specific (also referred to as UE-specific) identifier (e.g., C-RNTI and other UE-specific RNTIs). Otherwise, if the first parameter has not been configured, the first identifier will be equal to a cell identifier (e.g., $N_{ID}^{cell}$). Possibly, if a second parameter has been configured, the first identifier can be equal to the second parameter if the second parameter has been configured and if the second identifier does not correspond to a wireless-device-specific identifier, that is if the second identifier corresponds to a common identifier (e.g., P-RNTI, SI-RNTI, and other common RNTIs).

According to one aspect, some embodiments include a method performed by a radio network node. The method generally comprises obtaining a pseudo-random sequence initialization value, the pseudo-random sequence initialization value being based, at least in part, on a first identifier, wherein the first identifier equals to a first parameter if the first parameter has been configured and if a second identifier corresponds to a wireless-device-specific identifier; and obtaining a pseudo-random sequence based, at least in part, on the pseudo-random sequence initialization value.

In some embodiments, the first identifier may be equal to a cell identifier if the first parameter has not been configured or if the second identifier does not correspond to a wireless-device-specific identifier. In some embodiments, the first identifier may be equal to a second parameter if the second parameter has been configured and if the second identifier does not correspond to a wireless-device-specific identifier. In some embodiments, the second identifier may be a radio network temporary identifier, RNTI. In some embodiments, the wireless-device-specific identifier may be a cell RNTI, C-RNTI, a temporary C-RNTI, or a configured-scheduling RNTI, CS-RNTI.

In some embodiments, the method may comprise, or further comprise, scrambling a downlink message with the obtained pseudo-random sequence, and transmitting the scrambled downlink message to a wireless device. In some embodiments, the downlink message may be a shared channel downlink message (e.g., a physical downlink shared channel, PDSCH, message).

In some embodiments, the method may comprise, or further comprise, generating a downlink reference signal based at least in part on the obtained pseudo-random sequence, and transmitting the generated downlink reference signal to a wireless device. In some embodiments, the downlink reference signal may be a demodulation reference signal, DM-RS (e.g., a demodulation reference signal, DM-RS, associated with a physical downlink shared channel, PDSCH).

According to another aspect, some embodiments include a radio network node adapted, configured, enabled, or otherwise operable, to perform one or more of the described radio network node functionalities (e.g. actions, operations, steps, etc.).

In some embodiments, the radio network node may comprise one or more transceivers, one or more communication interfaces, and processing circuitry operatively connected to the one or more transceivers and to the one or more communication interfaces. The one or more transceivers are configured to enable the radio network node to communicate with one or more wireless devices over a radio interface. The one or more communication interfaces are configured to enable the radio network node to communicate with one or more other radio network nodes (e.g., via a radio access network communication interface), with one or more core network nodes (e.g., via a core network communication interface), and/or with one or more other network nodes. The processing circuitry is configured to enable the radio network node to perform one or more of the described radio network node functionalities. In some embodiments, the processing circuitry may comprise at least one processor and at least one memory, the memory storing instructions which, upon being executed by the processor, configure the at least one processor to enable the radio network node to perform one or more of the described radio network node functionalities.

In some embodiments, the radio network node may comprise one or more functional units (also referred to as modules) configured to perform one or more of the described radio network node functionalities. In some embodiments, these functional units may be embodied by the one or more transceivers and the processing circuitry of the radio network node.

According to another aspect, some embodiments include a computer program product. The computer program product comprises computer-readable instructions stored in a non-transitory computer-readable storage medium of the computer program product. When the instructions are executed by processing circuitry (e.g., at least one processor) of the radio network node, they enable the radio network node to perform one or more of the described radio network node functionalities.

According to another aspect, some embodiments include a method performed by a wireless device. The method generally comprises obtaining a pseudo-random sequence initialization value, the pseudo-random sequence initialization value being based, at least in part, on a first identifier, wherein the first identifier equals to a first parameter if the first parameter has been configured and if a second identifier corresponds to a wireless-device-specific identifier, and obtaining a pseudo-random sequence based, at least in part, on the pseudo-random sequence initialization value.

In some embodiments, the first identifier may be equal to a cell identifier if the first parameter has not been configured or if the second identifier does not correspond to a wireless-device-specific identifier. In some embodiments, the first identifier may be equal to a second parameter if the second parameter has been configured and if the second identifier does not correspond to a wireless-device-specific identifier. In some embodiments, the second identifier may be a radio network temporary identifier, RNTI. In some embodiments, the wireless-device-specific identifier may be a cell RNTI, C-RNTI, a temporary C-RNTI, or a configured-scheduling RNTI, CS-RNTI.

In some embodiments, the method may comprise, or further comprise, receiving a scrambled downlink message from a radio network node, and unscrambling the received scrambled downlink message with the obtained pseudo-random sequence. In some embodiments, the downlink message may be a shared channel downlink message (e.g., a physical downlink shared channel, PDSCH, message).

In some embodiments, the method may comprise, or further comprise, generating a reference signal based, at least in part, on the obtained pseudo-random sequence, receiving a downlink reference signal from a radio network node, and estimating a downlink channel based on a comparison between the downlink reference signal received from the radio network node and the reference signal generated by the wireless device. In some embodiments, the reference signal may be a demodulation reference signal, DM-RS (e.g., a demodulation reference signal, DM-RS, associated with a physical downlink shared channel, PDSCH).

According to another aspect, some embodiments include a wireless device adapted, configured, enabled, or otherwise operable, to perform one or more of the described wireless device functionalities (e.g. actions, operations, steps, etc.).

In some embodiments, the wireless device may comprise one or more transceivers and processing circuitry operatively connected to the one or more transceivers. The one or more transceivers are configured to enable the wireless device to communicate with one or more radio network nodes over a radio interface. The processing circuitry is configured to enable the wireless device to perform one or more of the described wireless device functionalities. In some embodiments, the processing circuitry may comprise at least one processor and at least one memory, the memory storing instructions which, upon being executed by the processor, enable the wireless device to perform one or more of the described wireless device functionalities.

In some embodiments, the wireless device may comprise one or more functional units (also referred to as modules) configured to perform one or more of the described wireless device functionalities. In some embodiments, these functional units may be embodied by the one or more transceivers and the processing circuitry of the wireless device.

According to another aspect, some embodiments include a computer program product. The computer program product comprises computer-readable instructions stored in a non-transitory computer-readable storage medium of the computer program product. When the instructions are executed by processing circuitry (e.g., at least one processor)

of the wireless device, they enable the wireless device to perform one or more of the described wireless device functionalities.

Some embodiments may enable the use of a configurable identifier in the generation of an initialization value for use in generating a scrambling or pseudo-random sequence when beneficial.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a," "an," and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 1:
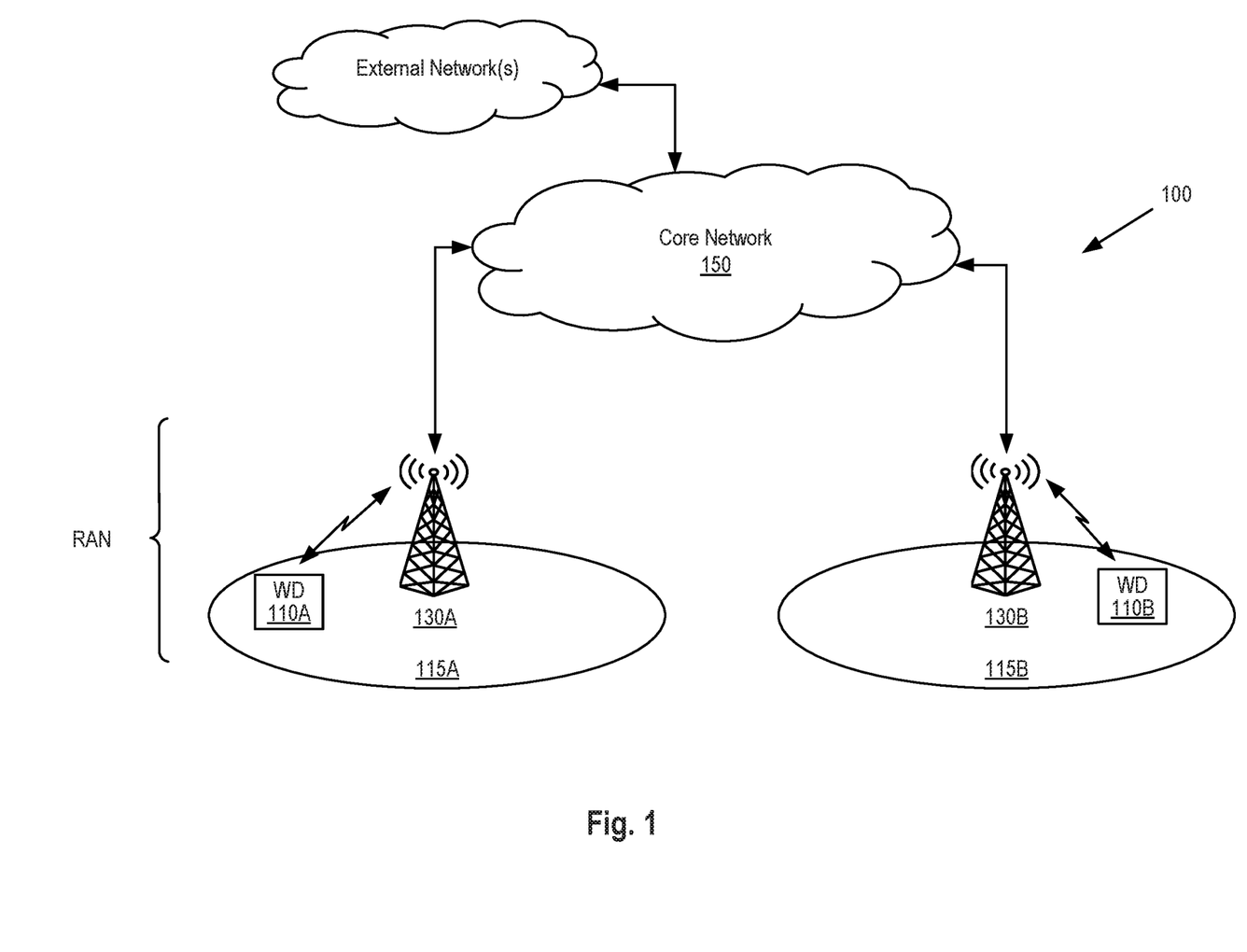
FIG. 1 is a schematic diagram of an example wireless communication network according to some embodiments.

FIG. 1 illustrates an example of a wireless communication network 100 that may be used for wireless communications. Wireless communication network 100 includes wireless devices 110A-110B (collectively referred to as wireless devices or WDs 110) and a plurality of radio network nodes 130A-130B (e.g., NBs and/or RNCs in UMTS, eNBs in LTE, gNBs in NR, etc.) (collectively referred to as radio network node or radio network nodes 130) directly or indirectly connected to a core network 150 which may comprise a plurality of core network nodes (e.g., SGSNs and/or GGSNs in UMTS, MMEs, SGWs, and/or PGWs in LTE/EPC, AMFs, SMFs, and/or UPFs in NGC, etc.) (collectively referred to as core network node or core network nodes). The wireless communication network 100 may use any suitable radio access network (RAN) deployment scenarios, including UMTS Terrestrial Radio Access Network, UTRAN, Evolved UMTS Terrestrial Radio Access Network, EUTRAN, and Next Generation Radio Access Network, NG-RAN. Wireless devices 110 within coverage areas 115 may each be capable of communicating directly with radio network nodes 130 over a wireless interface. In certain embodiments, wireless devices may also be capable of communicating with each other via device-to-device (D2D) communication.

As an example, wireless device 110A may communicate with radio network node 130A over a wireless interface. That is, wireless device 110A may transmit wireless signals to and/or receive wireless signals from radio network node 130A. The wireless signals may contain voice traffic, data traffic, control signals, and/or any other suitable information. In some embodiments, an area of wireless signal coverage associated with a radio network node 130 may be referred to as a cell.

In wireless networks such as wireless communication network 100, pseudo-random sequences are used in the transmission of some downlink messages and/or in the transmission of some downlink reference signal (In the present description, downlink generally refers to communication from the radio network node to one or more wireless devices while uplink generally refers to communications from one or more wireless devices to the radio network node.). For example, in wireless networks deployed according to the 3GPP LTE and/or NR standards, downlink messages sent over the physical downlink shared channels (PDSCH) are scrambled with a pseudo-random (or scrambling) sequence before being modulated and ultimately transmitted by the radio network node (e.g., eNB in LTE, gNB in NR) to the wireless device (e.g., UE in both LTE and NR). The scrambling of the downlink PDSCH messages is described in section 6.3.1 of 3GPP TS 36.211 V14.5.0 (for LTE) and in section 7.3.1.1 of 3GPP TS 38.211 V15.0.0 (for NR). Similarly, in wireless networks deployed according to the 3GPP LTE and/or 3GPP NR standards, downlink reference signals such as the UE-specific reference signals or demodulation reference signals (DM-RS) are generated using a pseudo-random sequence. The generation of the DM-RS is described in section 6.10.3.1 of 3GPP TS 36.211 V14.5.0 (for LTE) and in section 7.4.1.1.1 of 3GPP TS 38.211 V15.0.0 (for NR).

As indicated above, downlink messages that are targeted at multiple wireless devices such as paging messages, system information messages, etc., may not be delivered to wireless devices when a certain identifier (e.g., $n_{ID}$, $N_{ID}^{nSCID}$) has been configured by higher layers (e.g., by the RRC layer).

According to a broad embodiment, the identifier used in the generation of the initialization value and which can be configured by higher layers (e.g., $n_{ID}$, $N_{ID}^{nSCID}$) takes the value of a first parameter, that is the parameter configured by the higher layer(s) only when the first parameter is configured and when a second identifier is a wireless-device-specific identifier. By doing so, the configurable identifier can be configured to a particular value when necessary and/or beneficial. Additional details and embodiments are disclosed below.

Figure 2:
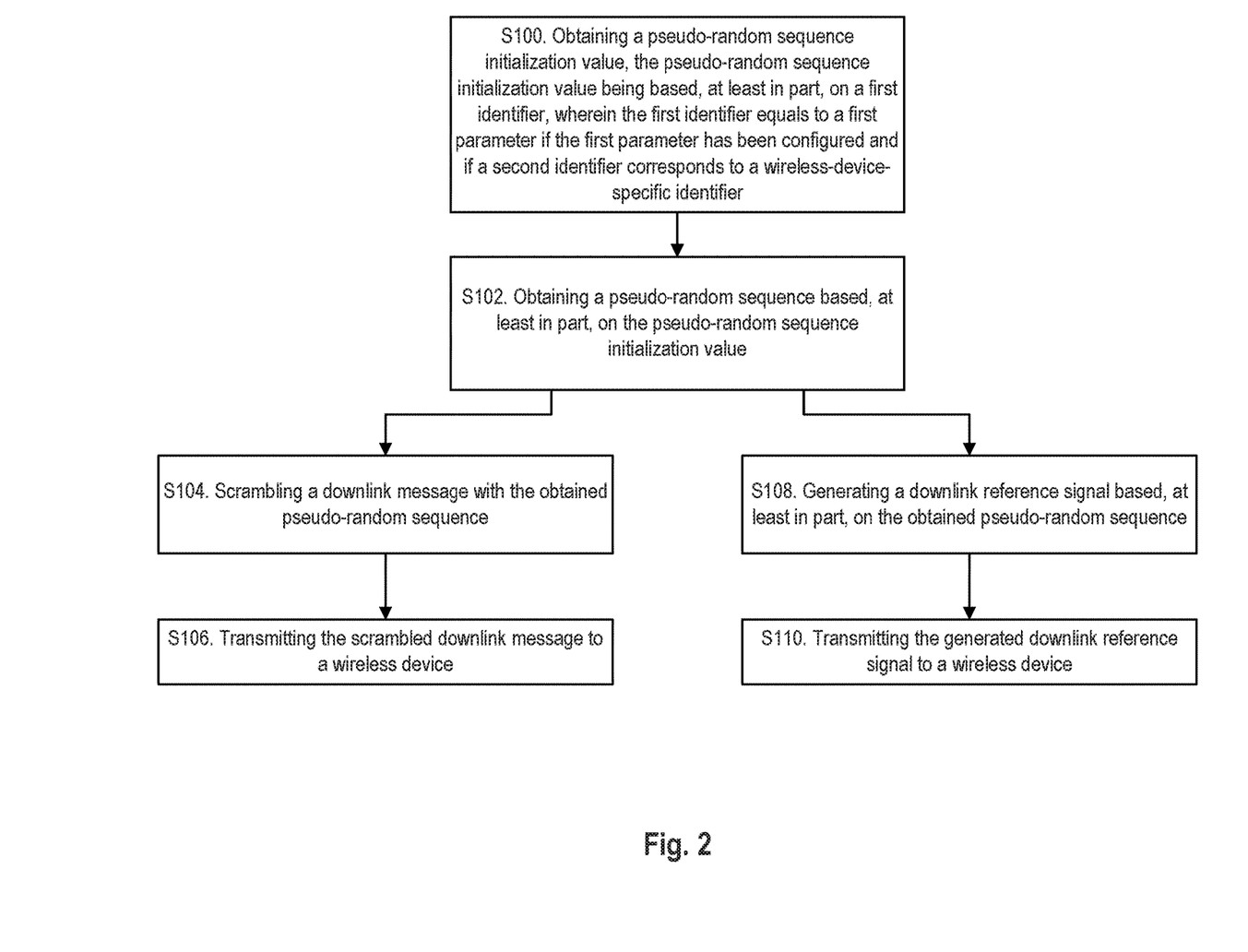
FIG. 2 is a flow chart of operations of a radio network node according to some embodiments.

FIG. 2 is a flow chart that illustrates some operations of a radio network node 130 according to some embodiments. As illustrated, the radio network node 130 first obtains a pseudo-random sequence initialization value (e.g., $c_{init}$) which will be used when subsequently obtaining the pseudo-random (or scrambling) sequence (action S100). The pseudo-random sequence initialization value is based, at least in part, on a first identifier (e.g., $n_{ID}$, $N_{ID}^{nSCID}$). In some embodiments, the first identifier equals to a first parameter (e.g., Data-scrambling-Identity or DL-DMRS-Scrambling-ID) if the first parameter has been configured and if a second identifier corresponds to a wireless-device-specific identifier.

In some embodiments, how the pseudo-random sequence initialization value (e.g., $c_{init}$) is obtained may differ according to the intended use of the pseudo-random sequence initialization value. For instance, when the pseudo-random sequence initialization value is used to generate or otherwise obtain a scrambling sequence to scramble a downlink message, the pseudo-random sequence initialization value may be obtained using the relation described in section 7.3.1.1 of 3GPP TS 38.211:

$$c_{init} = n_{RNTI} \cdot 2^{15} + q \cdot 2^{14} + n_{ID}$$

wherein $n_{ID}$ corresponds to the first identifier mentioned above.

When the pseudo-random sequence initialization value is used to generate or otherwise obtain a pseudo-random sequence to generate or otherwise obtain a downlink reference signal, the pseudo-random sequence initialization value may be obtained using the relation described in section 7.3.1.1 of 3GPP TS 38.211:

$$c_{init} = (2^{17}(14n_s + l + 1)(2N_{ID}^{nSCID} + 1) + 2N_{ID}^{nSCID} + n_{SCID}) \mod 2^{31}$$

wherein $N_{ID}^{nSCID}$ corresponds to the first identifier mentioned above.

Regardless of how the pseudo-random sequence initialization value is obtained, as indicated above, the value of the first identifier will be equal to the first parameter if the first parameter is configured (typically by higher layer(s) such as the RRC layer) and if the second identifier corresponds to a wireless-device-specific identifier.

In some embodiments, the second identifier is a radio network temporary identifier (RNTI). In NR, RNTIs are summarized in section 7.1 of 3GPP TS 38.321 V15.0.0. However, not all RNTIs are wireless-device-specific RNTIs. For instance, paging RNTI (P-RNTI) and system information RNTI (SI-RNTI) are usually not wireless-device-specific RNTIs in the sense that they do not identify a unique wireless device. However, cell RNTI (C-RNTI), temporary C-RNTI, and configured scheduling RNTI (CS-RNTI) are usually wireless-device-specific RNTIs in the sense that they identify a unique wireless device. Understandably, other RNTIs exist and still other RNTIs may be developed in the future. As such, the above RNTIs are non-limitative examples of RNTIs.

Hence, when the first parameter is configured and when the second identifier is a wireless-device-specific identifier, the first identifier equals to the first parameter.

If the first parameter has not been configured and/or if the second identifier is not a wireless-device-specific identifier, then there are at least two possible scenarios.

In a first scenario, when the first parameter has not been configured and/or when the second identifier is not a wireless-device-specific identifier, then the first identifier takes a default value. In NR, this default value can be a cell identifier such as $N_{ID}^{cell}$.

In some embodiments, the following sections of 3GPP TS 38.211 V15.0.0 may be modified as follows to enable one or more of the described embodiments, including the first scenario.

======<<<<<<–3GPP TS 38.211 V15.0.0>>>>>>======

7.3.1.1 Scrambling

Up to two codewords can be transmitted, $q \in \{0,1\}$. In case of single-codeword transmission, $q=0$.

For each codeword q, the UE shall assume the block of bits $b^{(q)}(0), \ldots, b^{(q)}(M_{bit}^{(q)}-1)$, where $M_{bit}^{(q)}$ is the number of bits in codeword q transmitted on the physical channel, are scrambled prior to modulation, resulting in a block of scrambled bits $\tilde{b}^{(q)}(0), \ldots, \tilde{b}^{(q)}(M_{bit}^{(q)}-1)$ according to $$\tilde{b}^{(q)}(i) = (b^{(q)}(i) + c^{(q)}(i)) \mod 2$$

where the scrambling sequence $c^{(q)}(i)$ is given by clause 5.2.1. The scrambling sequence generator shall be initialized with $$c_{init} = n_{RNTI} \cdot 2^{15} + q \cdot 2^{14} + n_{ID}$$

where $n_{ID} \in \{0, 1, \ldots, 1023\}$ equals the higher-layer parameter Data-scrambling-Identity if configured and if the RNTI equals the C-RNTI (or another UE-specific RNTI), $n_{ID} = N_{ID}^{cell}$ otherwise 7.4.1.1.1 Sequence generation The UE shall assume the reference-signal sequence r(m) is defined by $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is defined in clause 5.2. The pseudo-random sequence generator shall be initialized with $$c_{init} = (2^{17}(14n_s + l + 1)(2N_{ID}^{nSCID} + 1) + 2N_{ID}^{nSCID} + n_{SCID}) \mod 2^{31}$$

where l is the OFDM symbol number within the slot and $n_{SCID} \in \{0,1 \text{ and } N_{ID}^{nSCID} \in 0, 1, \ldots, 65535\}$ is given by the higher-layer parameter DL-DMRS-Scrambling-ID if provided and if the RNTI equals the C-RNTI (or another UE-specific RNTI), $n_{SCID} = 0$ and $N_{ID}^{nSCID} = N_{ID}^{cell}$ otherwise

======<<<<<<3GPP TS 38.211 V15.0.0>>>>>>======

In a second scenario, it is possible that a second parameter (e.g., Data-scrambling-Identity-Common or DL-DMRS-Scrambling-ID-Common) be configured. In such a case, if the second parameter has been configured and if the second identifier is not a wireless-device-specific identifier, then the first identifier takes the value of the second parameter.

In some embodiments, the following sections of 3GPP TS 38.211 V15.0.0 may be modified as follows to enable one or more of the described embodiments, including the second scenario.

=======<<<<<<3GPP TS 38.211 V15.0.0>>>>>>=======

7.3.1.1 Scrambling

Up to two codewords can be transmitted, $q \in \{0,1\}$. In case of single-codeword transmission, $q=0$.

For each codeword q, the UE shall assume the block of bits $b^{(q)}(0), \ldots, b^{(q)}(M_{bit}^{(q)}-1)$, where $M_{bit}^{(q)}$ is the number of bits in codeword q transmitted on the physical channel, are scrambled prior to modulation, resulting in a block of scrambled bits $\tilde{b}^{(q)}(0), \ldots, \tilde{b}^{(q)}(M_{bit}^{(q)}-1)$ according to $$\tilde{b}^{(q)}(i) = (b^{(q)}(i) + c^{(q)}(i)) \bmod 2$$

where the scrambling sequence $c^{(q)}(i)$ is given by clause 5.2.1. The scrambling sequence generator shall be initialized with $$c_{init} = n_{RNTI} \cdot 2^{15} + q \cdot 2^{14} + n_{ID}$$

where $n_{ID} \in \{0,1, \ldots, 1023\}$ equals the higher-layer parameter Data-scrambling-Identity if configured and if the RNTI equals the C-RNTI (or another UE-specific RNTI), $n_{ID} \in \{0,1, \ldots, 1023\}$ equals the higher-layer parameter Data-scrambling-Identity-Common if configured and if the RNTI does not equal the C-RNTI (or another UE-specific RNTI), $n_{ID} = N_{ID}^{cell}$ otherwise 7.4.1.1.1 Sequence Generation The UE shall assume the reference-signal sequence r(m) is defined by $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is defined in clause 5.2. The pseudo-random sequence generator shall be initialized with $$c_{init} = (2^{17}(14n_s + l + 1)(2N_{ID}^{nSCID} + 1) + 2N_{ID}^{nSCID} + n_{SCID}) \bmod 2^{31}$$

where l is the OFDM symbol number within the slot and $n_{SCID} \in \{0,1\}$ and $N_{ID}^{nSCID} \in \{0,1, \ldots, 65535\}$ is given by the higher-layer parameter DL-DMRS-Scrambling-ID if provided and if the RNTI equals the C-RNTI (or another UE-specific RNTI), $n_{SCID} \in \{0,1\}$ and $N_{ID}^{nSCID} \in \{0,1, \ldots, 65535\}$ is given by the higher-layer parameter DL-DMRS-Scrambling-ID-Common if provided and if the RNTI does not equal the C-RNTI (or another UE-specific RNTI), $n_{SCID} = 0$ and $N_{ID}^{nSCID} = N_{cell}^{ID}$ otherwise

=======<<<<<<3GPP TS 38.211 V15.0.0>>>>>>=======

Understandably, other scenarios are possible.

Once the pseudo-random sequence initialization value is obtained, the radio network node then obtains a pseudo-random sequence based, at least in part, on the previously obtained pseudo-random sequence initialization value (action S102). In NR for instance, the generation of the pseudo-random sequence is described in section 5.2.1 of 3GPP TS 38.211 V15.0.0.

Then, the radio network node 130 may use the obtained pseudo-random sequence differently depending on whether the pseudo-random sequence is used with a downlink message or with a downlink reference signal.

When the obtained pseudo-random sequence is to be used with a downlink message (e.g., a PDSCH message), the radio network node 130 scrambles the downlink message with the obtained pseudo-random sequence (action S104) prior to transmitting the scrambled downlink message to a wireless device to which the downlink message is directed (action S106). The scrambling of the downlink message is described, for instance, in section 7.3.1.1 of 3GPP TS 38.211 V15.0.0.

When the obtained pseudo-random sequence is to be used with a downlink reference signal (e.g., a DM-RS), the radio network node 130 generates the downlink reference signal based, at least in part, on the obtained pseudo-random sequence (action S108) prior to transmitting the generated downlink reference signal to the wireless device (action S110). The generation of the downlink reference signal DM-RS is described, for instance, in section 7.4.1.1.1 of 3GPP TS 38.211 V15.0.0.

Figure 3:
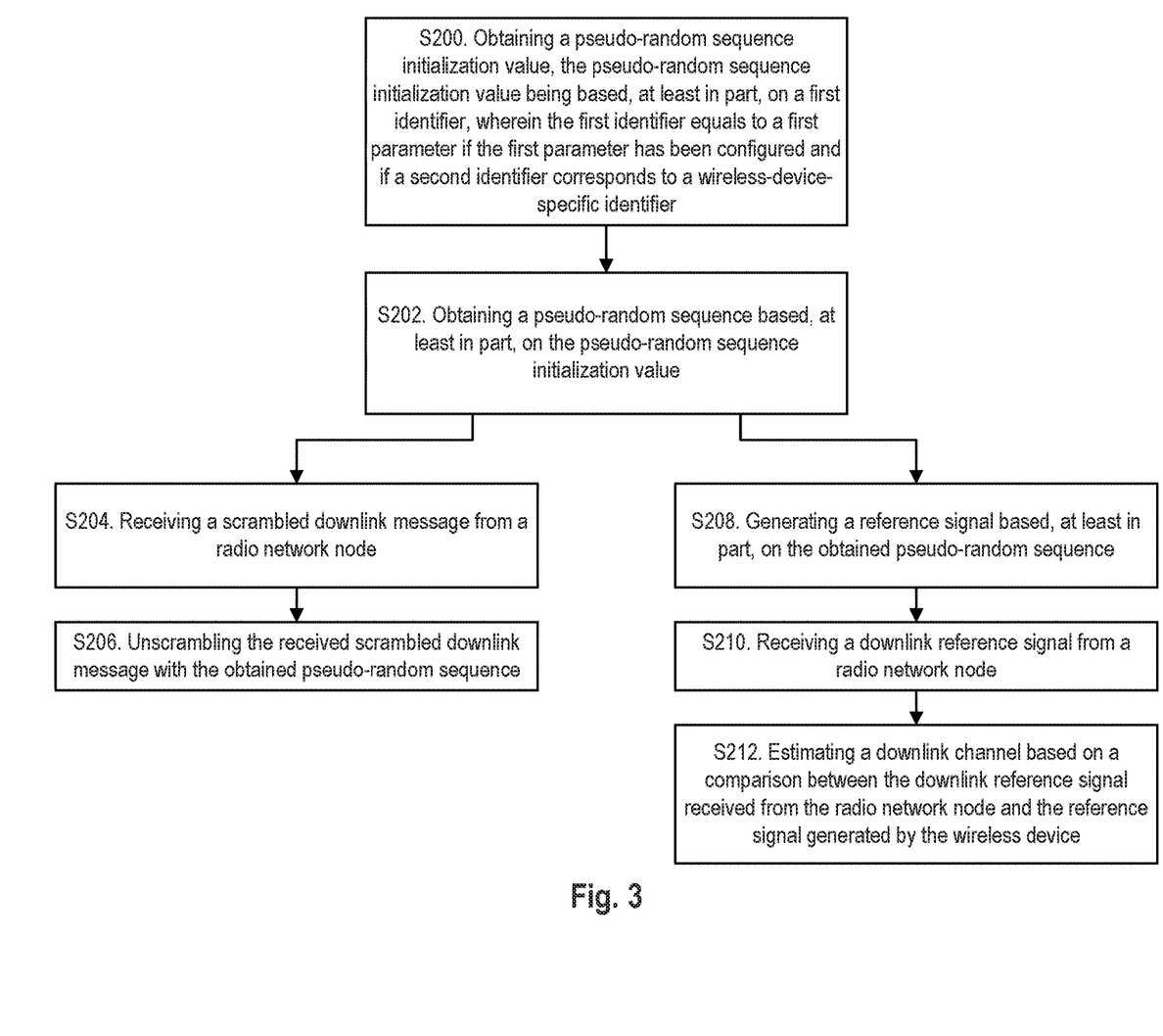
FIG. 3 is a flow chart of operations of a wireless device according to some embodiments.

FIG. 3 is a flow chart that illustrates some operations of a wireless device 110 according to some embodiments. As illustrated, the wireless device 110 first obtains a pseudo-random sequence initialization value (e.g., $c_{init}$) which will be used when subsequently obtaining the pseudo-random (or scrambling) sequence (action S200). The pseudo-random sequence initialization value is based, at least in part, on a first identifier (e.g., $n_{ID}$, $N_{ID}^{nSCID}$). In some embodiments, the first identifier equals a first parameter if the first parameter has been configured and if a second identifier corresponds to a wireless-device-specific identifier.

In some embodiments, how the pseudo-random sequence initialization value (e.g., $c_{init}$) is obtained may differ according to the intended use of the pseudo-random sequence initialization value. For instance, when the pseudo-random sequence initialization value is to be used to generate or otherwise obtain a scrambling sequence to scramble a downlink message, the pseudo-random sequence initialization value may be obtained using the relation described in section 7.3.1.1 of 3GPP TS 38.211:

$$c_{init} = n_{RNTI} \cdot 2^{15} + q \cdot 2^{14} + n_{ID}$$

wherein $n_{ID}$ corresponds to the first identifier mentioned above.

When the pseudo-random sequence initialization value is to be used to generate or otherwise obtain a pseudo-random sequence to generate or otherwise obtain a downlink reference signal, the pseudo-random sequence initialization value may be obtained using the relation described in section 7.3.1.1 of 3GPP TS 38.211:

$$c_{init} = (2^{17}(14n_s + l + 1)(2N_{ID}^{nSCID} + 1) + 2N_{ID}^{nSCID} + n_{SCID}) \bmod 2^{31}$$

wherein $N_{ID}^{nSCID}$ corresponds to the first identifier mentioned above.

Regardless of how the pseudo-random sequence initialization value is obtained, as indicated above, the value of the first identifier will be equal to the first parameter if the first parameter is configured (typically by higher layer(s) such as the RRC layer) and if the second identifier corresponds to a wireless-device-specific identifier.

In some embodiments, the second identifier is a radio network temporary identifier (RNTI). In NR, RNTIs are summarized in section 7.1 of 3GPP TS 38.321 V15.0.0. However, not all RNTIs are wireless-device-specific RNTIs. For instance, paging RNTI (P-RNTI) and system information RNTI (SI-RNTI) are usually not wireless-device-specific RNTIs in the sense that they do not identify a unique wireless device. However, cell RNTI (C-RNTI), temporary C-RNTI, and configured scheduling RNTI (CS-RNTI) are usually wireless-device-specific RNTIs in the sense that they identify a unique wireless device. Understandably, other RNTIs exist and still other RNTIs may be developed in the future. As such, the above RNTIs are non-limitative examples of RNTIs.

Hence, when the first parameter is configured and when the second identifier is a wireless-device-specific identifier, the first identifier equals to the first parameter.

If the first parameter has not been configured and/or if the second identifier is not a wireless-device-specific identifier, then there are at least two possible scenarios.

In a first scenario, when the first parameter has not been configured and/or when the second identifier is not a wireless-device-specific identifier, then the first identifier takes a default value. In NR, this default value can be a cell identifier such as $N_{ID}^{cell}$.

In some embodiments, the following sections of 3GPP TS 38.211 V15.0.0 may be modified as follows to enable one or more of the described embodiments, including the first scenario.

=====<<<<<<3GPP TS 38.211 V15.0.0>>>>>=====

7.3.1.1 Scrambling

Up to two codewords can be transmitted, $q \in \{0,1\}$. In case of single-codeword transmission, q=0.

For each codeword q, the UE shall assume the block of bits $b^{(q)}(0), \ldots, b^{(q)}(M_{bit}^{(q)}-1)$, where $M_{bit}^{(q)}$ is the number of bits in codeword q transmitted on the physical channel, are scrambled prior to modulation, resulting in a block of scrambled bits $\tilde{b}^{(q)}(0), \ldots, \tilde{b}^{(q)}(M_{bit}^{(q)}-1)$ according to $$\tilde{b}^{(q)}(i)=(b^{(q)}(i)+c^{(q)}(i)) \bmod 2$$

where the scrambling sequence $c^{(q)}(i)$ is given by clause 5.2.1. The scrambling sequence generator shall be initialized with $$c_{init}=n_{RNTI} \cdot 2^{15}+q \cdot 2^{14}+n_{ID}$$

where
$n_{ID} \in \{0,1, \ldots, 1023\}$ equals the higher-layer parameter Data-scrambling-Identity if configured and if the RNTI equals the C-RNTI (or another UE-specific RNTI),
$n_{ID}=N_{ID}^{cell}$ otherwise 7.4.1.1.1 Sequence Generation The UE shall assume the reference-signal sequence r(m) is defined by $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is defined in clause 5.2. The pseudo-random sequence generator shall be initialized with $$c_{init}=(2^{17}(14n_s+l+1)(2N_{ID}^{nSCID}+1)+2N_{ID}^{nSCID}+n_{SCID}) \bmod 2^{31}$$

where l is the OFDM symbol number within the slot and
$n_{SCID} \in \{0,1\}$ and $N_{ID}^{nSCID} \in \{0,1, \ldots, 65535\}$ is given by the higher-layer parameter DL-DMRS-Scrambling-ID if provided and if the RNTI equals the C-RNTI (or another UE-specific RNTI),
$n_{SCID}=0$ and $N_{ID}^{nSCID}=N_{ID}^{cell}$ otherwise

=====<<<<<<3GPP TS 38.211 V15.0.0>>>>>=====

In a second scenario, it is possible that a second parameter (e.g., Data-scrambling-Identity-Common or DL-DMRS-Scrambling-ID-Common) be configured. In such a case, if the second parameter has been configured and if the second identifier is not a wireless-device-specific identifier, then the first identifier takes the value of the second parameter.

In some embodiments, the following sections of 3GPP TS 38.211 V15.0.0 may be modified as follows to enable one or more of the described embodiments, including the second scenario.

=====<<<<<<3GPP TS 38.211 V15.0.0>>>>>=====

7.3.1.1 Scrambling

Up to two codewords can be transmitted, $q \in \{0,1\}$. In case of single-codeword transmission, q=0.

For each codeword q, the UE shall assume the block of bits $b^{(q)}(0), \ldots, b^{(q)}(M_{bit}^{(q)}-1)$, where $M_b$ is the number of bits in codeword q transmitted on the physical channel, are scrambled prior to modulation, resulting in a block of scrambled bits $\tilde{b}^{(q)}(0), \ldots, \tilde{b}^{(q)}(M_{bit}^{(q)}-1)$ according to $$\tilde{b}^{(q)}(i)=(b^{(q)}(i)+c^{(q)}(i)) \bmod 2$$

where the scrambling sequence $c^{(q)}(i)$ is given by clause 5.2.1. The scrambling sequence generator shall be initialized with $$c_{init}=n_{RNTI} \cdot 2^{15}+q \cdot 2^{14}+n_{ID}$$

where
$n_{ID} \in \{0,1, \ldots, 1023\}$ equals the higher-layer parameter Data-scrambling-Identity if configured and if the RNTI equals the C-RNTI (or another UE-specific RNTI),
$n_{ID} \in \{0,1, \ldots, 1023\}$ equals the higher-layer parameter Data-scrambling-Identity-Common if configured and if the RNTI does not equal the C-RNTI (or another UE-specific RNTI),
$n_{ID}=N_{ID}^{cell}$ otherwise 7.4.1.1.1 Sequence generation The UE shall assume the reference-signal sequence r(m) is defined by $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is defined in clause 5.2. The pseudo-random sequence generator shall be initialized with $$c_{init}=(2^{17}(14n_s+l+1)(2N_{ID}^{nSCID}+1)+2N_{ID}^{nSCID}+n_{SCID}) \bmod 2^{31}$$

where l is the OFDM symbol number within the slot and
$n_{SCID} \in \{0,1\}$ and $N_{ID}^{nSCID} \in \{0,1, \ldots, 65535\}$ is given by the higher-layer parameter DL-DMRS-Scrambling-ID if provided and if the RNTI equals the C-RNTI (or another UE-specific RNTI),
$n_{SCID} \in \{0,1\}$ and $N_{ID}^{nSCID} \in \{0,1, \ldots, 65535\}$ is given by the higher-layer parameter DL-DMRS-Scrambling-ID-Common if provided and if the RNTI does not equal the C-RNTI (or another UE-specific RNTI),
$n_{SCID}=0$ and N $N_{ID}^{nSCID}=N_{ID}^{cell}$ otherwise

=====<<<<<<3GPP TS 38.211 V15.0.0>>>>>=====

Understandably, other scenarios are possible.

Once the pseudo-random sequence initialization value is obtained, the wireless device then obtains a pseudo-random sequence based, at least in part, on the previously obtained pseudo-random sequence initialization value (action S202). In NR for instance, the generation of the pseudo-random sequence is described in section 5.2.1 of 3GPP TS 38.211 V15.0.0.

Then, the wireless device 110 may use the obtained pseudo-random sequence differently depending on whether the pseudo-random sequence is used with a downlink message or with a downlink reference signal.

When the obtained pseudo-random sequence is to be used with a downlink message (e.g., a PDSCH message), the wireless device 110 usually first receives a downlink message which has been previously scrambled by the sending radio network node (see action S104) (action S204), and then uses the obtained pseudo-random sequence to unscramble the received (and previously scrambled) downlink message (action S206).

When the obtained pseudo-random sequence is to be used with a downlink reference signal (e.g., a DM-RS), the wireless device 110 generates a (local) downlink reference signal based, at least in part, on the obtained pseudo-random sequence (action S208). The wireless device 110 also receives a downlink reference signal (e.g., DM-RS) from the radio network node (action S210). The wireless device then estimates a downlink channel based on a comparison between the downlink reference signal received from the radio network node and the reference signal generated by the wireless device (action S212). The results of the channel estimation can be used, for instance, in demodulating downlink messages received from the radio network node 130.

Embodiments of a radio network node 130 will now be described with respect to FIGS. 4 and 5. As used herein, a "radio network node" is any node in a radio access network of a wireless communication network that operates to wirelessly transmit and/or receive signals. Notably, various communication standards sometimes use different terminologies when referring to or describing radio network nodes. For instance, in addition to base station, 3GPP also uses Node B (NB), evolved Node B (eNB), and Next Generation Node B (gNB). For its part, IEEE 802.11 (also known as WiFi™) uses the term access point (AP). Some examples of a radio network node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Figure 4:
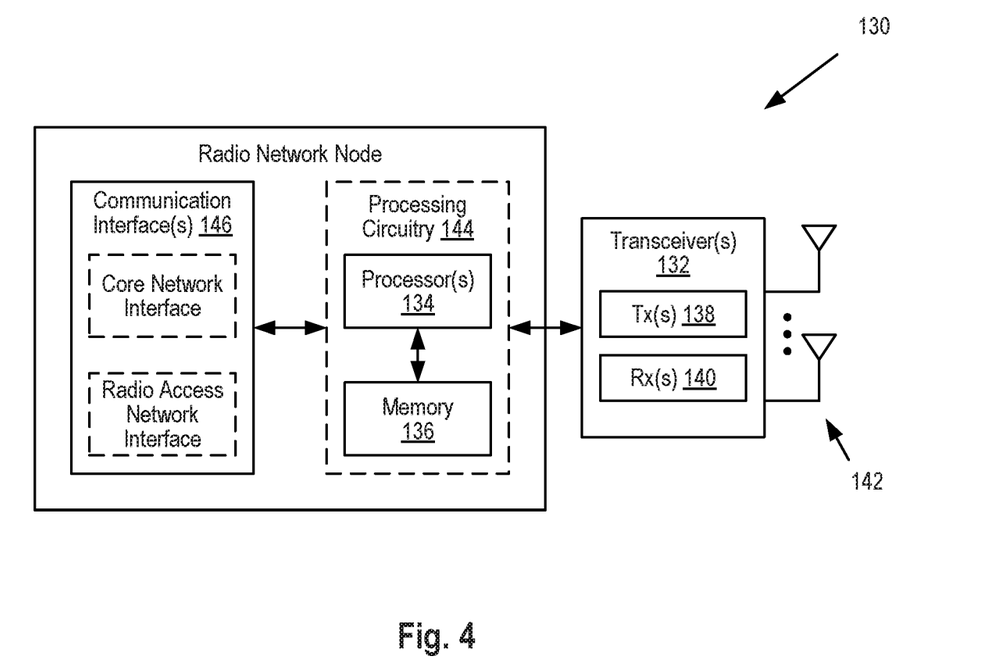
FIG. 4 is a block diagram of a radio network node according to some embodiments.
Figure 5:
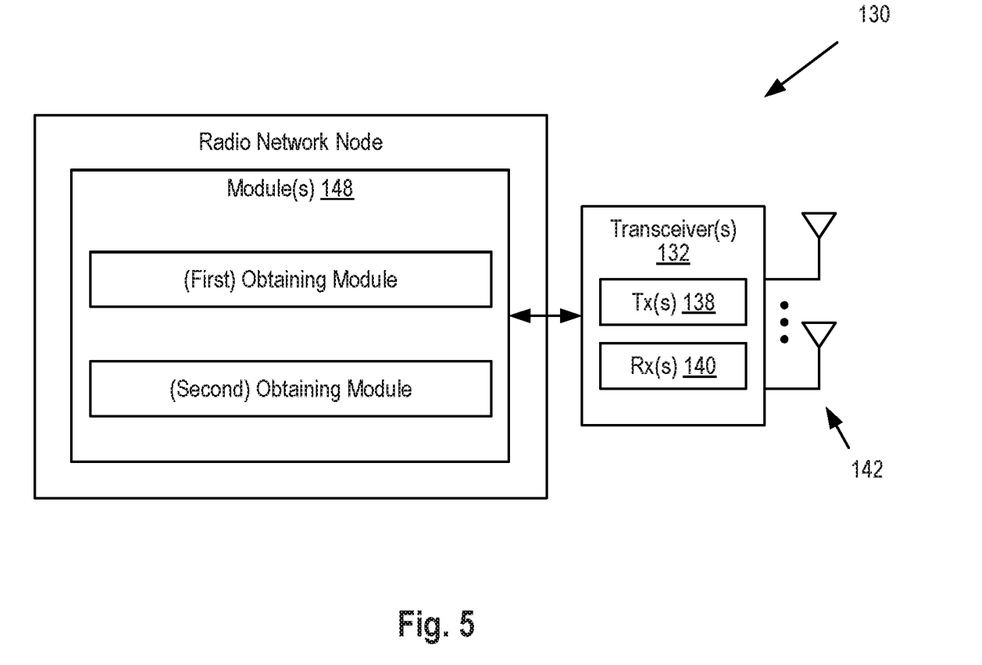
FIG. 5 is another block diagram of a radio network node according to some embodiments.

FIG. 4 is a block diagram of an exemplary radio network node 130 according to some embodiments. Radio network node 130 may include one or more of a transceiver 132, a processor 134, a memory 136, and one or more communication interface(s) 146. In some embodiments, the transceiver 132 facilitates transmitting wireless signals to and receiving wireless signals from wireless devices 110 (e.g., via transmitter(s) (Tx) 138, receiver(s) (Rx) 140, and antenna(s) 142). The processor 134 executes instructions to provide some or all of the functionalities described above as being provided by a radio network node 130, and the memory 136 stores the instructions to be executed by the processor 134. In some embodiments, the processor 134 and the memory 136 form processing circuitry 144. The communication interface(s) 146 enable the radio network 130 to communicate with other network nodes, including other radio network nodes (via a radio access network interface) and core network nodes (via a core network interface).

The processor 134 may include any suitable combination of hardware to execute instructions and manipulate data to perform some or all of the described functions of radio network node 130, such as those described above. In some embodiments, the processor 134 may include, for example, one or more computers, one or more central processing units (CPUs), one or more microprocessors, one or more application specific integrated circuits (ASICs), one or more field programmable gate arrays (FPGAs) and/or other logic.

The memory 136 is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the communication interface 146 is communicatively coupled to the processor 134 and may refer to any suitable device operable to receive input for radio network node 130, send output from radio network node 130, perform suitable processing of the input or output or both, communicate to other devices, or any combination of the preceding. The communication interface 146 may include appropriate hardware (e.g., port, modem, network interface card, etc.) and software, including protocol conversion and data processing capabilities, to communicate through a network.

Other embodiments of radio network node 130 may include additional components beyond those shown in FIG. 4 that may be responsible for providing certain aspects of the radio network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

In some embodiments, the radio network node 130 may comprise a series of modules (or units) 148 configured to implement some or all the functionalities of the radio network node 130 described above. Referring to FIG. 5, in some embodiments, the radio network node 130 may comprise a (first) obtaining module configured to obtain a pseudo-random sequence initialization value, the pseudo-random sequence initialization value being based, at least in part, on a first identifier, wherein the first identifier equals to a first parameter if the first parameter has been configured and if a second identifier corresponds to a wireless-device-specific identifier, and a (second) obtaining module configured to obtaining a pseudo-random sequence based, at least in part, on the pseudo-random sequence initialization value. In some embodiments, the radio network node 130 may comprise, or further comprise, a scrambling module configured to scramble a downlink message with the obtained pseudo-random sequence, and a transmitting module configured to transmit the scrambled downlink message to a wireless device. Additionally, or alternatively, in some embodiments, the radio network node 130 may comprise, or further comprise, a generating module configured to generate a downlink reference signal based at least in part on the obtained pseudo-random sequence, and a transmitting module configured to transmit the generated downlink reference signal to a wireless device.

It will be appreciated that the various modules 148 may be implemented as combination of hardware and/or software, for instance, the processor 134, memory 136, and transceiver(s) 132 of radio network node 130 shown in FIG. 4. Some embodiments may also include additional modules 148 to support additional and/or optional functionalities.

Some embodiments of a wireless device 110 will now be described with respect to FIGS. 6 and 7. Even though the expression "wireless device" is used throughout the description, it is to be understood that the expression is used generically. In that sense, a wireless device (WD) generally refers to a device capable, configured, arranged and/or operable to communicate wirelessly with one or more network nodes (e.g., radio network nodes) and/or with one or more other wireless devices. Notably, different communication standards may use different terminology when referring to or describing wireless device. For instance, 3GPP uses the terms User Equipment (UE) and Mobile Terminal (MT). For its part, 3GPP2 uses the terms Access Terminal (AT) and Mobile Station (MS). And IEEE 802.11 (also known as WiFi™) uses the term station (STA). In some embodiments, a wireless device may be configured to transmit and/or receive information without direct human interaction. Such a wireless device may be referred to as a Machine Type Communication (MTC) device or as a Machine-to-Machine (M2M) device.

Figure 6:
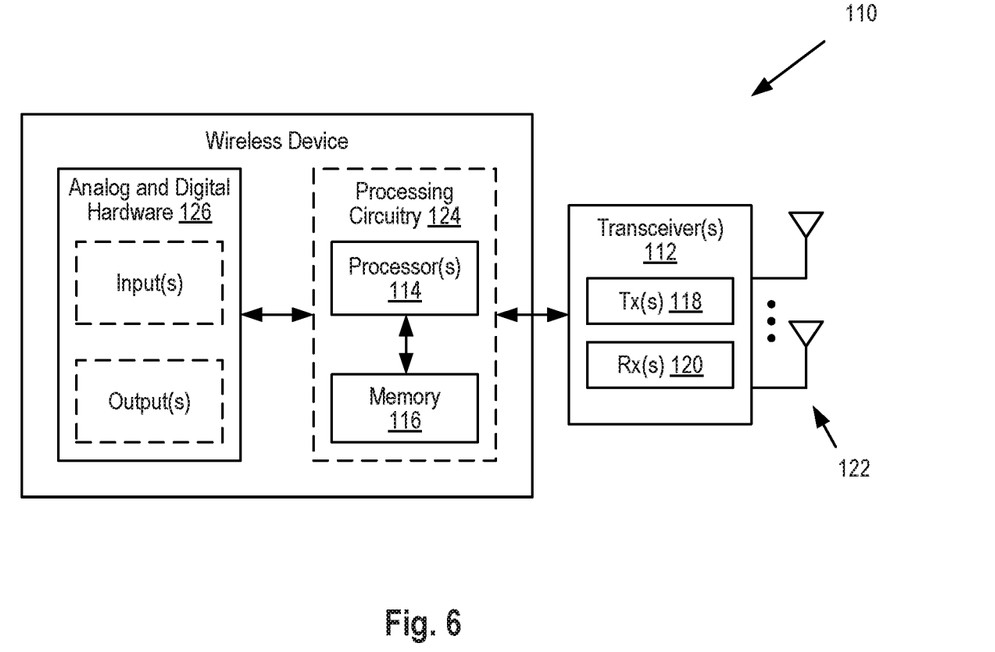
FIG. 6 is a block diagram of a wireless device according to some embodiments.

FIG. 6 is a block diagram of an exemplary wireless device 110 according to some embodiments. Wireless device 110 includes one or more of a transceiver 112, processor 114, and memory 116. In some embodiments, the transceiver 112 facilitates transmitting wireless signals to and receiving wireless signals from radio network node 130 (e.g., via transmitter(s) (Tx) 118, receiver(s) (Rx) 120, and antenna(s) 122). The processor 114 executes instructions to provide some or all of the functionalities described above as being provided by wireless device 110, and the memory 116 stores the instructions to be executed by the processor 114. In some embodiments, the processor 114 and the memory 116 form processing circuitry 124.

The processor 114 may include any suitable combination of hardware to execute instructions and manipulate data to perform some or all of the described functions of wireless device 110, such as the functions of wireless device 110 described above. In some embodiments, the processor 114 may include, for example, one or more computers, one or more central processing units (CPUs), one or more microprocessors, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor of wireless device 110.

Other embodiments of wireless device 110 may include additional components beyond those shown in FIG. 6 that may be responsible for providing certain aspects of the wireless device functionalities, including any of the functionalities described above and/or any additional functionalities (including any functionality necessary to support the solution(s) described above). As just one example, wireless device 110 may include input devices and circuits, output devices, and one or more synchronization units or circuits, which may be part of the processor. Input devices include mechanisms for entry of data into wireless device 110. As an example, wireless device 110 may include additional hardware 126 such as input devices and output devices. Input devices include input mechanisms such as microphone, input elements, display, etc. Output devices include mechanisms for outputting data in audio, video and/or hard copy format. For example, output devices may include a speaker, a display, etc.

Figure 7:
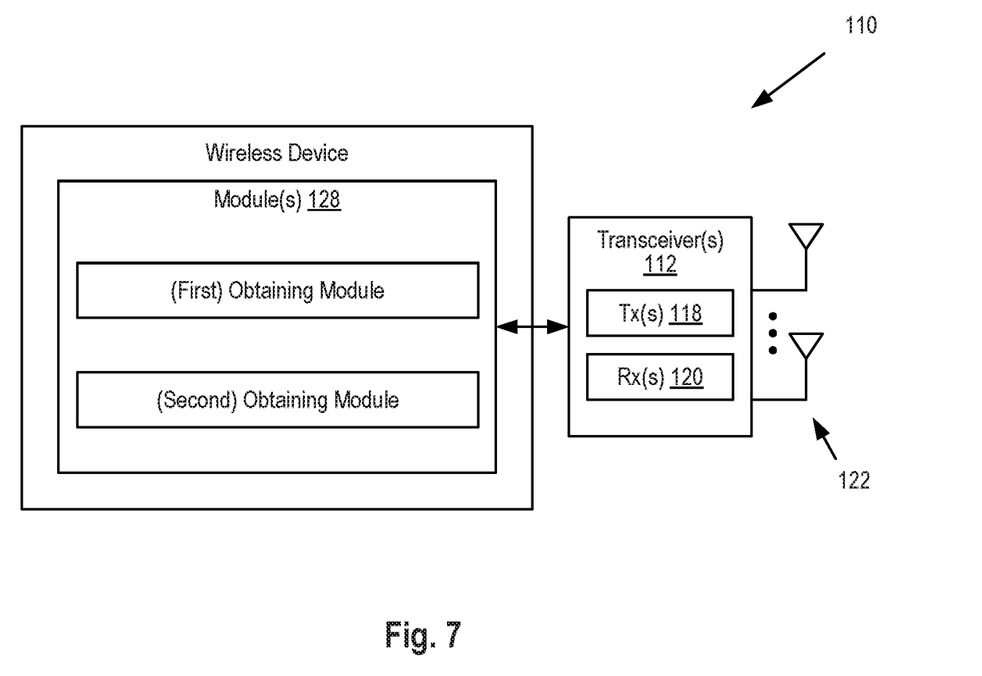
FIG. 7 is another block diagram of a wireless device according to some embodiments.

FIG. 7 is a block diagram of another exemplary wireless device 110 according to some embodiments. As illustrated, in some embodiments, the wireless device 110 may comprise a series of modules (or units) 128 configured to implement some or all of the functionalities of the wireless device 110 described above. More particularly, in some embodiments, the wireless device 110 may comprise a (first) obtaining module configured to obtain a pseudo-random sequence initialization value, the pseudo-random sequence initialization value being based, at least in part, on a first identifier, wherein the first identifier equals to a first parameter if the first parameter has been configured and if a second identifier corresponds to a wireless-device-specific identifier, a (second) obtaining module configured to obtain a pseudo-random sequence based, at least in part, on the pseudo-random sequence initialization value. In some embodiments, the wireless device may comprise, or further comprise, a receiving module configured to receive a scrambled downlink message from a radio network node, and an unscrambling module configured to unscramble the received scrambled downlink message with the obtained pseudo-random sequence. Additionally, or alternatively, in some embodiments, the wireless device may comprise, or further comprise, a generating module configured to generate a reference signal based, at least in part, on the obtained pseudo-random sequence, a receiving module configured to receive a downlink reference signal from a radio network node, and an estimating module configured to estimate a downlink channel based on a comparison between the downlink reference signal received from the radio network node and the reference signal generated by the wireless device.

It will be appreciated that the various modules 128 may be implemented as combination of hardware and/or software, for instance, the processor 114, memory 116, and transceiver(s) 112 of wireless device 110 shown in FIG. 6. Some embodiments may also include additional modules 128 to support additional and/or optional functionalities Some embodiments may be represented as a non-transitory software product stored in a machine-readable medium (also referred to as a computer-readable medium, a processor-readable medium, or a computer usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Abbreviations

The present description may comprise one or more of the following abbreviations:
CCE Control Channel Element
DAI Downlink Assignment Index
DCI Downlink Control Information
HARQ Hybrid Automatic Repeat Request
PDCCH Physical Downlink Control Channel
PUSCH Physical Uplink Shared Channel
UCI Uplink Control Information
UL-SCH Uplink Shared Channel

RELATED STANDARD REFERENCES

The following references may be related to the present description:
3GPP TS 38.211 V15.0.0
3GPP TS 36.211 V14.5.0

What is claimed is:

1. A method in a radio network node, the method comprising:
obtaining a pseudo-random sequence initialization value, the pseudo-random sequence initialization value being based, at least in part, on a first identifier and on a second identifier, the first identifier being equal to a first parameter if the first parameter has been configured and if the second identifier corresponds to a wireless-device-specific identifier, and the first identifier being equal to a cell identifier if one of:
the first parameter has not been configured; and
the second identifier does not correspond to a wireless-device-specific identifier;
obtaining a pseudo-random sequence based, at least in part, on the pseudo-random sequence initialization value;
scrambling a downlink message with the obtained pseudo-random sequence; and
transmitting the scrambled downlink message to a wireless device.

2. The method of claim 1, wherein the second identifier is a radio network temporary identifier, RNTI.

3. The method of claim 2, wherein the wireless-device-specific identifier is a cell RNTI, C-RNTI, a temporary C-RNTI, or a configured-scheduling RNTI, CS-RNTI.

4. The method of claim 1, wherein the downlink message is a shared channel downlink message.

5. The method of claim 1, wherein the downlink message is a physical downlink shared channel, PDSCH, message.

6. A radio network node comprising:
a processing circuitry; and
a transceiver in communication with the processing circuitry, the processing circuitry and the transceiver configured to cause the radio network node to:
obtain a pseudo-random sequence initialization value, the pseudo-random sequence initialization value being based, at least in part, on a first identifier and on a second identifier, the first identifier being equal to a first parameter if the first parameter has been configured and if the second identifier corresponds to a wireless-device-specific identifier, and the first identifier being equal to a cell identifier if one of:
the first parameter has not been configured; and
the second identifier does not correspond to a wireless-device-specific identifier;
obtain a pseudo-random sequence based, at least in part, on the pseudo-random sequence initialization value;
scramble a downlink message with the obtained pseudo-random sequence; and
transmit the scrambled downlink message to a wireless device.

7. The radio network node of claim 6, wherein the second identifier is a radio network temporary identifier, RNTI.

8. The radio network node of claim 7, wherein the wireless-device-specific identifier is a cell RNTI, C-RNTI, a temporary C-RNTI, or a configured-scheduling RNTI, CS-RNTI.

9. The radio network node of claim 6, wherein the downlink message is a shared channel downlink message.

10. The radio network node of claim 6, wherein the downlink message is a physical downlink shared channel, PDSCH, message.

11. A method in a wireless device, the method comprising:
obtaining a pseudo-random sequence initialization value, the pseudo-random sequence initialization value being based, at least in part, on a first identifier and on a second identifier, the first identifier being equal to a first parameter if the first parameter has been configured and if the second identifier corresponds to a wireless-device-specific identifier, and the first identifier being equal to a cell identifier if one of:
the first parameter has not been configured; and
the second identifier does not correspond to a wireless-device-specific identifier;
obtaining a pseudo-random sequence based, at least in part, on the pseudo-random sequence initialization value;
receiving a scrambled downlink message from a radio network node; and
unscrambling the received scrambled downlink message with the obtained pseudo-random sequence.

12. The method of claim 11, wherein the second identifier is a radio network temporary identifier, RNTI.

13. The method of claim 12, wherein the wireless-device-specific identifier is a cell RNTI, C-RNTI, a temporary C-RNTI, or a configured-scheduling RNTI, CS-RNTI.

14. The method of claim 11, wherein the downlink message is a shared channel downlink message.

15. The method of claim 11, wherein the downlink message is a physical downlink shared channel, PDSCH, message.

16. A wireless device comprising:
a processing circuitry; and
a transceiver in communication with the processing circuitry, the processing circuitry and the transceiver configured to cause the wireless device to:
obtain a pseudo-random sequence initialization value, the pseudo-random sequence initialization value being based, at least in part, on a first identifier and on a second identifier, the first identifier being equal to a first parameter if the first parameter has been configured and if the second identifier corresponds to a wireless-device-specific identifier, and the first identifier being equal to a cell identifier if one of:
the first parameter has not been configured; and the second identifier does not correspond to a wireless-device-specific identifier;
obtain a pseudo-random sequence based, at least in part, on the pseudo-random sequence initialization value;
receive a scrambled downlink message from a radio network node; and
unscramble the received scrambled downlink message with the obtained pseudo-random sequence.

17. The wireless device of claim 16, wherein the second identifier is a radio network temporary identifier, RNTI.

18. The wireless device of claim 17, wherein the wireless-device-specific identifier is a cell RNTI, C-RNTI, a temporary C-RNTI, or a configured-scheduling RNTI, CS-RNTI.

19. The wireless device of claim 16, wherein the downlink message is a shared channel downlink message.

20. The wireless device of claim 16, wherein the downlink message is a physical downlink shared channel, PDSCH, message.

\* \* \* \* \*

UNITED STATES PATENT AND TRADEMARK OFFICE
CERTIFICATE OF CORRECTION

PATENT NO. : 11,356,311 B2
APPLICATION NO. : 16/957199
DATED : June 7, 2022
INVENTOR(S) : Parkvall et al.

It is certified that error appears in the above-identified patent and that said Letters Patent is hereby corrected as shown below:

On the Title Page

On Page 2, item (56), in Column 2, Lines 10-11, delete "Item: 7 2.3.3;" and insert -- Item: 7.2.3.3; --, therefor.

On Page 2, item (56), in Column 2, Line 23, delete "Novembers," and insert -- November, --, therefor.

On Page 2, item (56), in Column 2, Line 34, delete "Techniquess for Interface" and insert -- Techniques for Interference --, therefor.

On Page 2, item (56), in Column 2, Line 44, delete "3 pages." and insert -- 8 pages. --, therefor.

On Page 2, item (56), in Column 2, Line 51, delete "2021." and insert -- 2021, consisting of 13 pages. --, therefor.

In the Specification

In Column 1, Line 14, delete "No." and insert -- No.: --, therefor.

In Column 7, Line 12, delete "(e.g., $c_{int}$)" and insert -- (e.g., $c_{init}$) --, therefor.

In Column 8, Line 13, delete "======<<<<<-3GPP TS 38.211 V15.0.0>>>>>======" and insert -- ======<<<<<<3GPP TS 38.211 V15.0.0>>>>>====== --, therefor.

In Column 8, Line 53, delete "$n_{SCID} \in \{0,1\}$ and $N_{ID}^{n_{SCID}} \in 0,1,\ldots,65535\}$" and insert -- $n_{SCID} \in \{0,1\}$ and $N_{ID}^{n_{SCID}} \in \{0,1,\ldots,65535\}$ --, therefor.

Signed and Sealed this
Fourteenth Day of February, 2023

*Katherine Kelly Vidal*
Katherine Kelly Vidal
*Director of the United States Patent and Trademark Office*

CERTIFICATE OF CORRECTION (continued)
U.S. Pat. No. 11,356,311 B2

In Column 8, Lines 58-59, delete "======<<<<<<3GPP TS 38.211 V15.0.0>>>>>======" and insert -- ======<<<<<<3GPP TS 38.211 V15.0.0>>>>>====== --, therefor.

In Column 9, Line 51, delete "$n_{SCID}=0$ and $N_{ID}^{n_{SCID}}=N_{cell}^{ID}$" and insert --$n_{SCID}=0$ and $N_{ID}^{n_{SCID}}=N_{ID}^{cell}$--, therefor.

In Column 11, Line 19, delete "====<<<<<<3GPP TS 38.211 V15.0.0>>>>>======" and insert -- ======<<<<<<3GPP TS 38.211 V15.0.0>>>>>====== --, therefor.

In Column 12, Line 10, delete "$M_b$)" and insert -- $M_{bit}^{(q)}$ --, therefor.

In Column 12, Line 54, delete "$n_{SCID}=0$ and N $N_{ID}^{n_{SCID}}=N_{ID}^{cell}$" and insert --$n_{SCID}=0$ and $N_{ID}^{n_{SCID}}=N_{ID}^{cell}$--, therefor.